(12) United States Patent
Okahara

(10) Patent No.: US 12,523,293 B2
(45) Date of Patent: Jan. 13, 2026

(54) CONTROL DEVICE FOR TRANSMISSION, CONTROL METHOD FOR TRANSMISSION, AND NON-TRANSITORY COMPUTER-READABLE MEDIUM

(71) Applicant: JATCO Ltd, Fuji (JP)

(72) Inventor: Ken Okahara, Atsugi (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 18/847,773

(22) PCT Filed: Mar. 13, 2023

(86) PCT No.: PCT/JP2023/009629
§ 371 (c)(1),
(2) Date: Sep. 17, 2024

(87) PCT Pub. No.: WO2023/176777
PCT Pub. Date: Sep. 21, 2023

(65) Prior Publication Data
US 2025/0207663 A1    Jun. 26, 2025

(30) Foreign Application Priority Data
Mar. 18, 2022 (JP) .................. 2022-043998

(51) Int. Cl.
*F16H 61/662*    (2006.01)
*F16H 47/06*    (2006.01)
(Continued)

(52) U.S. Cl.
CPC ....... *F16H 61/6624* (2013.01); *F16H 47/065* (2013.01); *F16H 59/44* (2013.01);
(Continued)

(58) Field of Classification Search
CPC ........ F16H 59/44; F16H 59/46; F16H 47/065; F16H 59/70; F16H 63/3023;
(Continued)

(56) References Cited

U.S. PATENT DOCUMENTS

| 5,888,160 | A | * | 3/1999 | Miyata | .................. F16H 37/022 475/216 |
| 5,890,992 | A | * | 4/1999 | Salecker | .............. B60K 28/165 477/86 |
| 6,024,674 | A | * | 2/2000 | Sato | .................. B60W 30/1819 477/181 |
| 7,744,505 | B2 | * | 6/2010 | Tanaka | .................. F16D 48/066 477/44 |

(Continued)

FOREIGN PATENT DOCUMENTS

JP    2014-070512 A    4/2014
JP    2020-076422 A    5/2020

*Primary Examiner* — Henry Y Liu
(74) *Attorney, Agent, or Firm* — Foley & Lardner LLP

(57) ABSTRACT

A controller for a transmission including a continuously variable transmission mechanism including a primary pulley to which power of an engine is input, a secondary pulley that transmits the power to a drive wheel, and a belt that is wound around the primary pulley and the secondary pulley, increases a rotation speed of the secondary pulley as a torque transmission capacity of a lock-up clutch of a torque converter provided between the engine and the primary pulley increases, and the lock-up clutch is engaged, performs a gear shift process to change a gear ratio of the continuously variable transmission mechanism to a high side or a low side so as to cancel return movement of a drive shaft which has been twisted by the engagement of the lock-up clutch.

10 Claims, 4 Drawing Sheets

(51) Int. Cl.
*F16H 59/44* (2006.01)
*F16H 59/46* (2006.01)
*F16H 59/70* (2006.01)
*F16H 63/30* (2006.01)

(52) U.S. Cl.
CPC ............. F16H 59/46 (2013.01); F16H 59/70 (2013.01); F16H 63/3023 (2013.01); *F16H 2059/704* (2013.01)

(58) Field of Classification Search
CPC ............... F16H 37/022; F16H 61/6624; F16H 61/66236; F16H 61/143; F16H 2059/704
USPC ......................................................... 474/11
See application file for complete search history.

(56) References Cited

U.S. PATENT DOCUMENTS

| | | | |
|---|---|---|---|
| 10,260,574 B2 * | 4/2019 | Yamamoto | F16H 63/3458 |
| 10,378,644 B2 * | 8/2019 | Iwasa | F16H 59/40 |
| 10,500,953 B2 * | 12/2019 | Yamamoto | F16D 48/06 |
| 10,955,047 B2 * | 3/2021 | Kazusa | F16H 61/0246 |
| 2008/0125284 A1 * | 5/2008 | Tanaka | F16D 48/066 |
| | | | 477/45 |
| 2008/0269012 A1 * | 10/2008 | Tanaka | F16H 61/061 |
| | | | 477/45 |
| 2012/0010798 A1 * | 1/2012 | Ito | B60W 10/184 |
| | | | 701/70 |
| 2018/0031058 A1 * | 2/2018 | Yamamoto | F16H 63/3458 |
| 2018/0106361 A1 * | 4/2018 | Iwasa | F16H 59/18 |
| 2018/0170177 A1 * | 6/2018 | Yamamoto | B60K 23/0808 |
| 2020/0109780 A1 * | 4/2020 | Kazusa | F16H 63/502 |

* cited by examiner

CONTROL DEVICE FOR TRANSMISSION, CONTROL METHOD FOR TRANSMISSION, AND NON-TRANSITORY COMPUTER-READABLE MEDIUM

TECHNICAL FIELD

The present invention relates to a control device for a transmission, a control method for a transmission, and a program.

BACKGROUND ART

Patent Document 1 discloses that, after engagement of a lock-up clutch of a torque converter is started, a rotation speed of an engine is kept higher than a rotation speed of a turbine of the torque converter until a speed of a vehicle exceeds a threshold value (such that vibration or shock associated with the engagement of the lock-up clutch does not occur), thereby preventing the lock-up clutch from being completely engaged.

PRIOR ART DOCUMENT

Patent Document

Patent Document 1: JP 2014-070512 A

SUMMARY OF INVENTION

However, in the invention described in Patent Document 1, the vibration caused by the engagement of the lock-up clutch may cause discomfort to a driver or the like.

Therefore, the present invention has been made in view of such a problem, and an object of the present invention is to provide a control device for a transmission, a control method for a transmission, and a program capable of preventing vibration caused by engagement of a lock-up clutch.

According to an aspect of the present invention, there is provided a control device for a transmission including a continuously variable transmission mechanism including a primary pulley, a secondary pulley, and an endless annular member, the primary pulley being configured to be input power of a drive source mounted on a vehicle, a secondary pulley being configured to transmit the power to a drive wheel, the endless annular member being wound around the primary pulley and the secondary pulley, in which a rotation speed of the secondary pulley increases as a torque transmission capacity of a lock-up clutch of a torque converter provided between the drive source and the primary pulley increases, and after the lock-up clutch is engaged, the control device performs a gear shift process to change a gear ratio of the continuously variable transmission mechanism to a high side or a low side so as to cancel return movement of a drive shaft which has been twisted by the engagement of the lock-up clutch.

According to another aspect of the present invention, there is provided a control method for a transmission including a continuously variable transmission mechanism including a primary pulley, a secondary pulley, and an endless annular member, the primary pulley being configured to be input power of a drive source mounted on a vehicle, a secondary pulley being configured to transmit the power to a drive wheel, the endless annular member being wound around the primary pulley and the secondary pulley, the method including: increasing a rotation speed of the secondary pulley as a torque transmission capacity of a lock-up clutch of a torque converter provided between the drive source and the primary pulley increases, and after the lock-up clutch is engaged, changing a gear ratio of the continuously variable transmission mechanism to a high side or a low side so as to cancel return movement of a drive shaft which has been twisted by the engagement of the lock-up clutch.

According to another aspect of the present invention, there is provided a program executable by a computer that controls a transmission including a continuously variable transmission mechanism including a primary pulley, a secondary pulley, and an endless annular member, the primary pulley being configured to be input power of a drive source mounted on a vehicle, a secondary pulley being configured to transmit the power to a drive wheel, the endless annular member being wound around the primary pulley and the secondary pulley, the program causing the computer to execute: a step of increasing a rotation speed of the secondary pulley as a torque transmission capacity of a lock-up clutch of a torque converter provided between the drive source and the primary pulley increases, and after the lock-up clutch is engaged, changing a gear ratio of the continuously variable transmission mechanism to a high side or a low side so as to cancel return movement of a drive shaft which has been twisted by the engagement of the lock-up clutch.

According to another aspect of the present invention, there is provided a control device for a transmission including a continuously variable transmission mechanism including a primary pulley, a secondary pulley, and an endless annular member, the primary pulley being configured to be input power of a drive source mounted on a vehicle, a secondary pulley being configured to transmit the power to a drive wheel, the endless annular member being wound around the primary pulley and the secondary pulley, in which a rotation speed of the secondary pulley increases as a torque transmission capacity of a lock-up clutch of a torque converter provided between the drive source and the primary pulley increases, and after the lock-up clutch is engaged, the control device changes a gear ratio of the continuously variable transmission mechanism to a high side after the rotation speed of the secondary pulley decreases and before the rotation speed of the secondary pulley increases.

According to these aspects, a vibration caused by engagement of a lock-up clutch can be prevented.

DESCRIPTION OF EMBODIMENTS

Hereinafter, an embodiment of the present invention (hereinafter, referred to as the present embodiment) will be described with reference to the accompanying drawings.
(Configuration of Transmission)

First, a transmission TM according to the present embodiment will be described with reference to FIG. 1.

Figure 1:
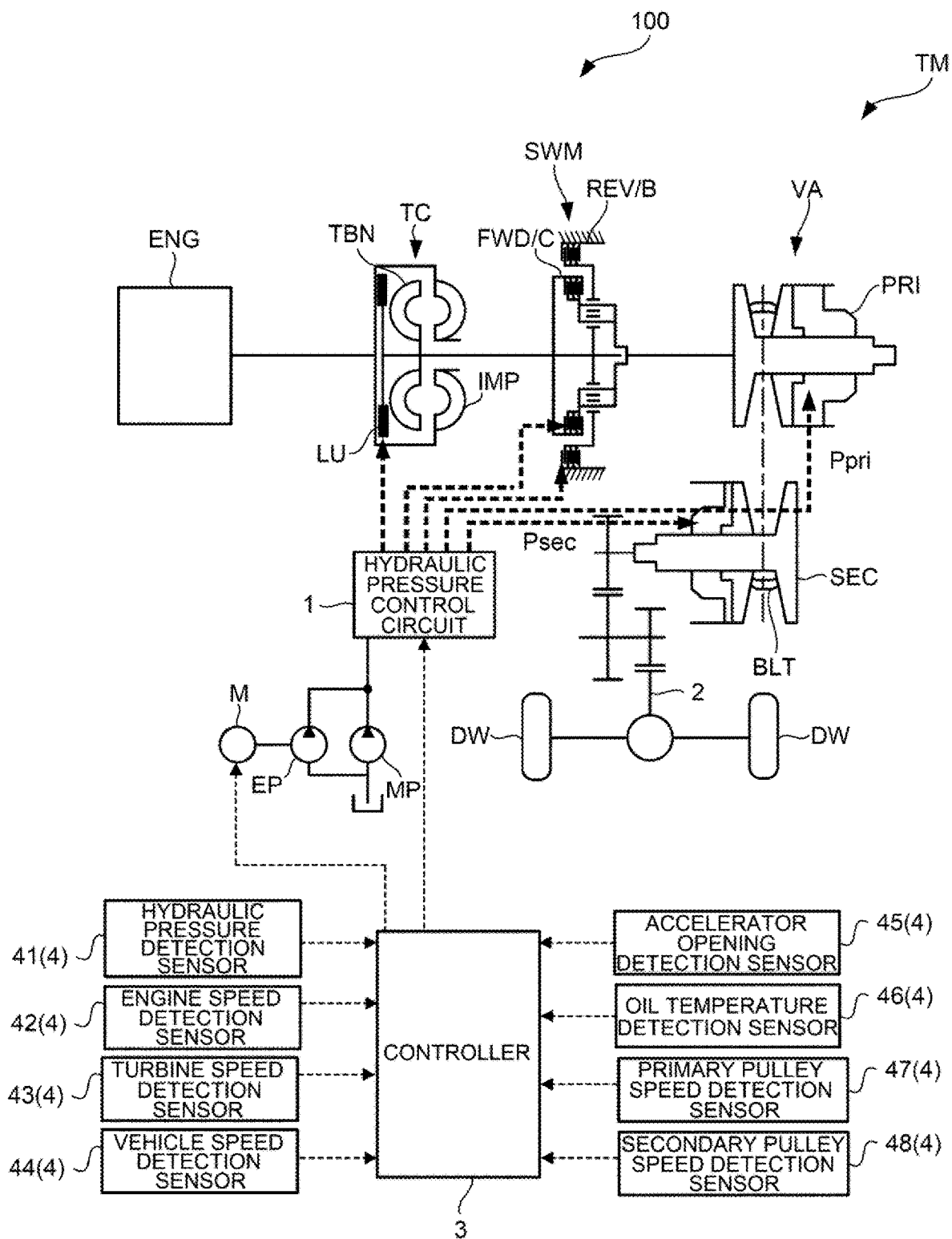
FIG. 1 is a schematic configuration diagram of a vehicle.

FIG. 1 is a schematic configuration diagram of a vehicle 100.

As shown in FIG. 1, the vehicle 100 includes an engine ENG, a torque converter TC, a forward and reverse switching mechanism SWM, and a variator VA. In the vehicle 100, a transmission TM is a belt continuously variable transmission including the torque converter TC, the forward and reverse switching mechanism SWM, and the variator VA.

The engine ENG constitutes a drive source of the vehicle 100. Power of the engine ENG is transmitted to drive wheels DW via the torque converter TC, the forward and reverse switching mechanism SWM, and the variator VA. In other words, the torque converter TC, the forward and reverse switching mechanism SWM, and the variator VA are provided in a power transmission path connecting the engine ENG and the drive wheels DW.

The torque converter TC transmits power via a fluid. The torque converter TC includes a lock-up clutch LU, a turbine TBN, and an impeller IMP. Further, in the torque converter TC, power transmission efficiency is enhanced by engaging the lock-up clutch LU.

The forward and reverse switching mechanism SWM is provided in a power transmission path connecting the engine ENG and the variator VA. The forward and reverse switching mechanism SWM switches forward and reverse of the vehicle 100 by switching a rotation direction of input rotation. The forward and reverse switching mechanism SWM includes a forward clutch FWD/C that is engaged when a forward range is selected and a reverse brake REV/B that is engaged when a reverse range is selected. When the forward clutch FWD/C and the reverse brake REV/B are disengaged, the transmission TM is in a neutral state, that is, a power cutoff state.

The variator VA configures a continuously variable transmission mechanism including a primary pulley PRI to which the power of the engine ENG is input, a secondary pulley SEC that transmits the power to the drive wheels DW via a drive shaft 2, and a belt BLT as a continuously variable annular member wound around the primary pulley PRI and the secondary pulley SEC. A primary pulley pressure Ppri, which is a hydraulic pressure of the primary pulley PRI, is supplied to the primary pulley PRI from a hydraulic pressure control circuit 1 to be described later, and a secondary pulley pressure Psec, which is a hydraulic pressure of the secondary pulley SEC, is supplied to the secondary pulley SEC from the hydraulic pressure control circuit 1.

The transmission TM further includes a mechanical oil pump MP, an electric oil pump EP, and an electric motor M.

The mechanical oil pump MP pumps (supplies) oil to the hydraulic pressure control circuit 1. The mechanical oil pump MP is driven by the power of the engine ENG.

The electric oil pump EP pumps (supplies) oil to the hydraulic pressure control circuit 1 together with or independently of the mechanical oil pump MP. The electric oil pump EP is auxiliary to the mechanical oil pump MP. That is, when the supply of oil from the mechanical oil pump MP to the transmission TM is stopped or insufficient, the electric oil pump EP temporarily supplies oil to the transmission TM based on a drive request to compensate for oil shortfall. The electric motor M drives the electric oil pump EP. It may be understood that the electric oil pump EP includes the electric motor M.

The transmission TM further includes the hydraulic pressure control circuit 1 and a controller 3 serving as a control device for the transmission TM. The hydraulic pressure control circuit 1 includes a plurality of flow paths and a plurality of hydraulic pressure control valves, regulates a pressure of the oil supplied from the mechanical oil pump MP and the electric oil pump EP, and supplies the oil to each part of the transmission TM.

The vehicle 100 further includes various sensors 4 that detect various parameters. The various sensors 4 include a hydraulic pressure detection sensor 41 as a hydraulic pressure detection unit that detects a hydraulic pressure in the hydraulic pressure control circuit 1, an engine speed detection sensor 42 as an engine speed detection unit that detects a rotation speed of the engine ENG, a turbine speed detection sensor 43 as a turbine speed detection unit that detects a rotation speed of the turbine TBN, a vehicle speed detection sensor 44 as a vehicle speed detection unit that detects a speed of the vehicle 100, an accelerator opening detection sensor 45 as an accelerator opening detection unit that detects an accelerator opening (that is, an acceleration and deceleration request from a driver), an oil temperature detection sensor 46 as an oil temperature detection unit that detects an oil temperature, a primary pulley speed detection sensor 47 as a primary pulley speed detection unit that detects a rotation speed of the primary pulley PRI, and a secondary pulley speed detection sensor 48 as a secondary pulley speed detection unit that detects a rotation speed of the secondary pulley SEC.

The controller 3 is a controller that controls the transmission TM, and controls the electric motor M that drives the hydraulic pressure control circuit 1 and the electric oil pump EP based on the various parameters output from the various sensors 4 and the like. The controller 3 is implemented by a microcomputer including a central processing unit (CPU), a read-only memory (ROM), a random access memory (RAM), and input/output interfaces (I/O interfaces) 31 and 32 (see FIG. 2). The controller 3 may also be implemented by a plurality of microcomputers. Details of the controller 3 will be described later.

The hydraulic pressure control circuit 1 controls hydraulic pressures of the lock-up clutch LU, the forward clutch FWD/C, the reverse brake REV/B, the primary pulley PRI, the secondary pulley SEC, and the like based on commands from the controller 3.

(Configuration of Controller)

Next, the controller 3 will be described with reference to FIG. 2.

Figure 2:
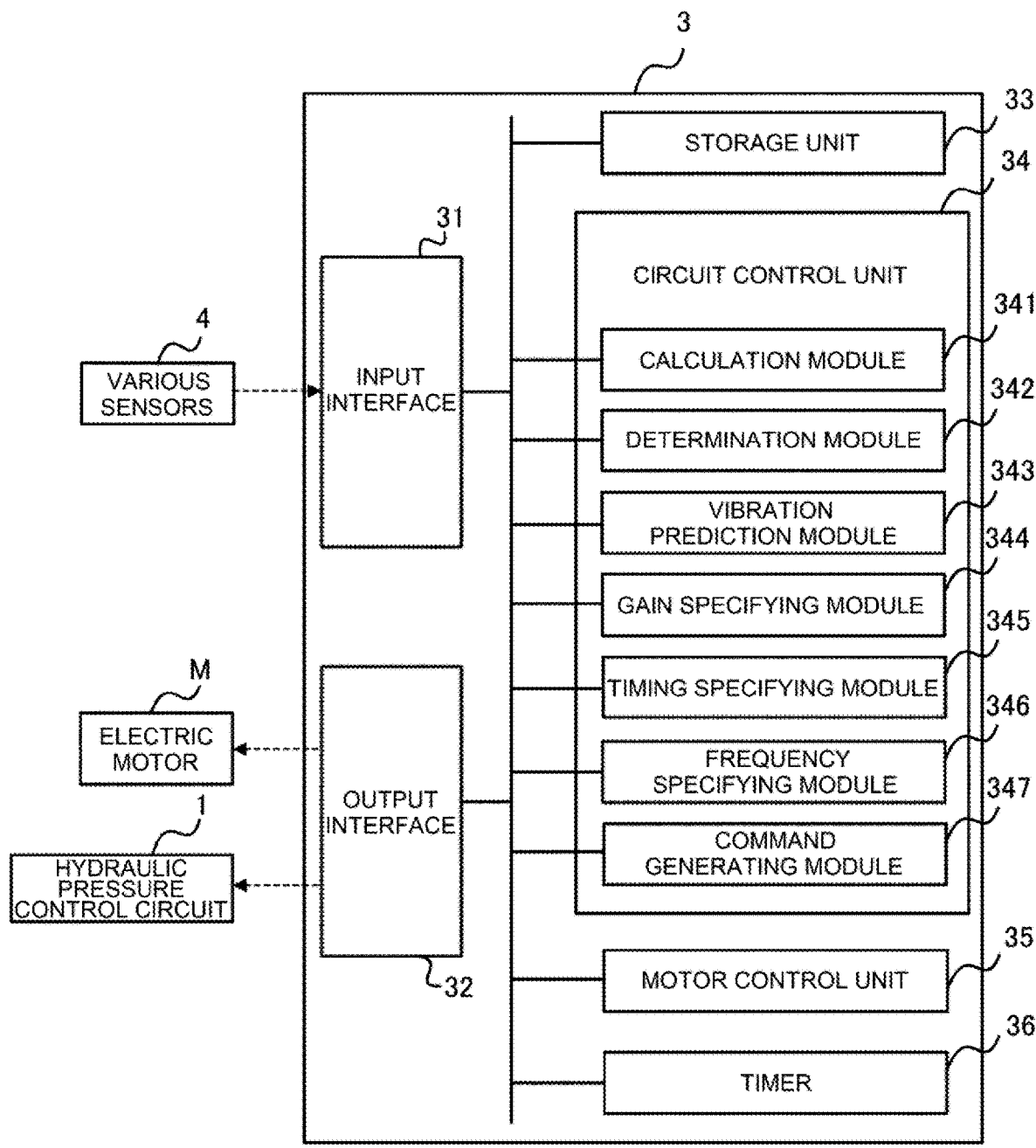
FIG. 2 is a configuration block diagram illustrating a controller and main configurations connected to the controller.

FIG. 2 is a configuration block diagram illustrating the controller 3 and main configurations connected to the controller 3.

As shown in FIG. 2, the controller 3 includes an input interface 31, an output interface 32, a storage unit 33, a hydraulic pressure control circuit control unit 34 (hereinafter, also simply referred to as a circuit control unit 34), an electric motor control unit 35 (hereinafter, also simply referred to as a motor control unit 35), and a timer 36, which are electrically connected to one another.

Output signals from various sensors 4 are input to the input interface 31.

A circuit control command generated by processing of the circuit control unit 34 and a control command generated by processing of the motor control unit 35 are output to the hydraulic pressure control circuit 1 and the electric motor M via the output interface 32, respectively.

The storage unit 33 is a memory that temporarily stores the various parameters in the output signals from the various sensors 4. The storage unit 33 stores processing programs and algorithm programs executed by the circuit control unit 34 and the motor control unit 35. In the present embodiment, the storage unit 33 is incorporated in the controller 3, but is not limited thereto, and may be provided separately from the controller 3, for example.

Further, the storage unit 33 stores a predetermined differential pressure used in a control process of the transmission TM, a predetermined decrease rate (rate of change) of a rotation speed difference, a predetermined rotation speed difference, a predetermined gear ratio range, a predetermined speed range, a predetermined oil temperature range, and a table in which a gear ratio of the variator VA and a natural frequency of a power train are associated with each other. Details of these parameters and the like are described in the control process of the transmission TM.

The circuit control unit 34 generates the circuit control command based on the various parameters output from the various sensors 4, and outputs the generated circuit control command to the hydraulic pressure control circuit 1 via the output interface 32.

The circuit control unit 34 includes a calculation module 341 as a calculation unit, a determination module 342 as a determination unit, a vibration prediction module 343 as a vibration prediction unit, a gain specifying module 344 as a gain specifying unit, a timing specifying module 345 as a timing specifying unit, a frequency specifying module 346 as a frequency specifying unit, and a command generating module 347 as a command generating unit. Details of these modules will be described later in the control process of the transmission TM.

The motor control unit 35 generates the control command based on the various parameters output from the various sensors 4, and outputs the generated control command to the electric motor M via the output interface 32.

The timer 36 detects a time.
(Mechanism of Gear Shift Process)

Next, a mechanism of a vibration damping process as part of a gear shift process will be described with reference to FIG. 3.

Figure 3:
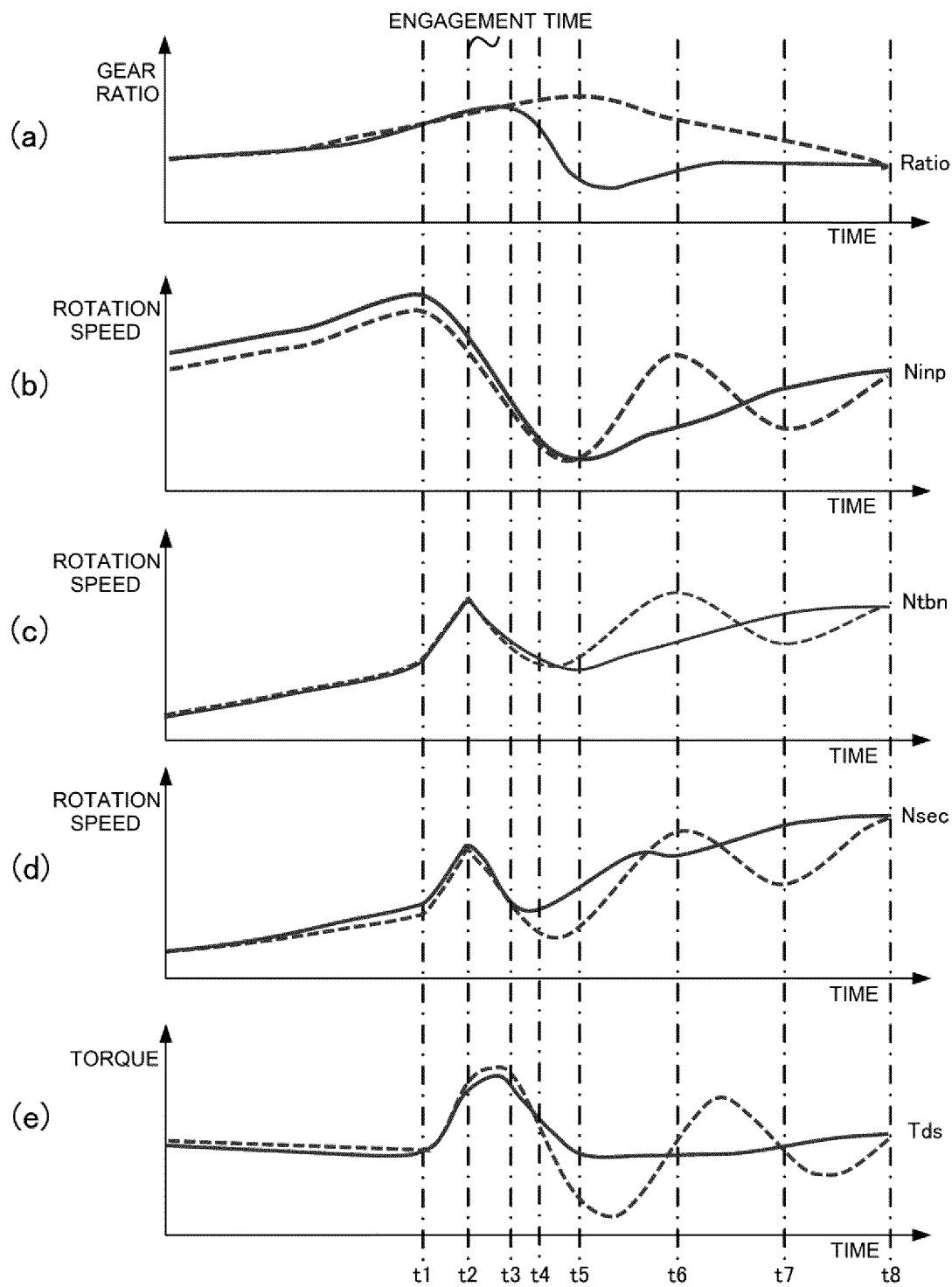
FIG. 3 shows time charts illustrating a change in each parameter before and after engagement of a lock-up clutch.

FIG. 3 shows time charts showing changes in respective parameters before and after the engagement of the lock-up clutch LU, which are caused by the vehicle speed and the acceleration and deceleration request (accelerator operation) of the driver. In (a) to (e) of FIG. 3, time charts of a case in which the vibration damping process is not performed (hereinafter, also simply referred to as "before vibration damping") and time charts of a case in which the vibration damping process is performed (hereinafter, also simply referred to as "after vibration damping") are indicated by broken lines and solid lines, respectively.

(a) of FIG. 3 shows a change in gear ratio Ratio of the variator VA over time before and after the engagement of the lock-up clutch LU. In (a) of FIG. 3, a time and the gear ratio are respectively referred to as a horizontal axis and a vertical axis. On the vertical axis in (a) of FIG. 3, a low side of the gear ratio (side on which a reduction ratio is increased) is an upper side, and a high side of the gear ratio (side on which the reduction ratio is decreased) is a lower side.

(b) of FIG. 3 shows a change in rotation speed $N_{imp}$ of the impeller IMP (that is, the engine ENG) over time before and after the engagement of the lock-up clutch LU. (c) of FIG. 3 shows a change in rotation speed $N_{tbn}$ of the turbine TBN over time before and after the engagement of the lock-up clutch LU. (d) of FIG. 3 shows a change in rotation speed $N_{sec}$ of the secondary pulley SEC over time before and after the engagement of the lock-up clutch LU. In each of (b) to (d) of FIG. 3, a time and the rotation speed are respectively referred to as a horizontal axis and a vertical axis.

(e) of FIG. 3 shows a change in torque $T_{ds}$ of the drive shaft 2 over time before and after the engagement of the lock-up clutch LU. In (e) of FIG. 3, a time and the torque are respectively referred to as a horizontal axis and a vertical axis.

As shown in (a) of FIG. 3, in the time chart before the vibration damping, depending on the vehicle speed and the acceleration and deceleration request (accelerator operation) of the driver, the gear ratio Ratio of the variator VA gradually increases over time (that is, changes to the low side) until a time point t1, and then gradually decreases (that is, changes to the high side "high frequency side").

On the other hand, as shown in (b) of FIG. 3, in the time chart before the vibration damping, the rotation speed Nimp of the impeller IMP (that is, the engine ENG) gradually increases over time before the engagement of the lock-up clutch LU. Further, in the time chart before the vibration damping, when the lock-up clutch LU begins to have a torque capacity, the rotation speed Nimp of the impeller IMP (that is, the engine ENG) begins to decrease at the time point t1. Further, after the lock-up clutch LU is engaged, the engagement of the lock-up clutch LU causes a vibration of the vehicle 100, and a waveform of a change in rotation speed Nimp of the impeller IMP (that is, the engine ENG) over time is formed to be (that is, a sine wave).

As shown in (c) of FIG. 3, in the time chart before the vibration damping, before the lock-up clutch LU is engaged, the rotation speed $N_{tbn}$ of the turbine TBN gradually increases over time due to an increase in the vehicle speed and an increase in gear ratio (reduction ratio) (shift to the low side, downshift). Further, the rotation speed $N_{tbn}$ of the turbine TBN rises suddenly over time from the time point t1 due to an increase in torque transmission capacity of the lock-up clutch LU. Furthermore, in the time chart before the vibration damping, after the lock-up clutch LU is engaged (after a time point t2), the rotation speed $N_{tbn}$ of the turbine TBN is reduced by inertia of the engine ENG (inertia of the engine ENG reduced by the engagement of the lock-up clutch LU). Thereafter, the rotation speed $N_{tbn}$ of the turbine TBN is affected by the vibration of the vehicle 100 caused by the engagement of the lock-up clutch LU, and the waveform of the change over time in rotation speed $N_{tbn}$ of the turbine TBN is formed to be (that is, a sine wave). After the lock-up clutch LU is engaged, the waveform of the change over time in the rotation speed $N_{imp}$ of the impeller IMP (that is, the engine ENG) and the waveform of the change over time in the rotation speed $N_{tbn}$ of the turbine TBN overlap with each other.

As shown in (d) of FIG. 3, in the time chart before the vibration damping, before the lock-up clutch LU is engaged, a rotation speed $N_{sec}$ of the secondary pulley SEC increases gently over time as the vehicle speed increases. Further, the rotation speed $N_{sec}$ of the secondary pulley SEC rises suddenly over time from the time point t1 due to the increase in torque transmission capacity of the lock-up clutch LU. Furthermore, in the time chart before the vibration damping, after the lock-up clutch LU is engaged (after the time point t2), the rotation speed $N_{sec}$ of the secondary pulley SEC is reduced by inertia of the engine ENG (inertia of the engine ENG reduced by the engagement of the lock-up clutch LU). Thereafter, the rotation speed $N_{sec}$ of the secondary pulley SEC is affected by the vibration of the vehicle 100 caused by the engagement of the lock-up clutch LU, and a waveform of a change over time in rotation speed $N_{sec}$ of the secondary pulley SEC is formed to be (that is, a sine wave).

As shown in (e) of FIG. 3, in the time chart before the vibration damping, before the lock-up clutch LU is engaged, torque $T_{ds}$ of the drive shaft 2 gradually decreases due to the vehicle speed and the acceleration and deceleration request (accelerator operation) of the driver. Further, the torque $T_{ds}$ of the drive shaft 2 rises suddenly over time from the time point t1 due to the increase in torque transmission capacity of the lock-up clutch LU. Furthermore, in the time chart before the vibration damping, after the lock-up clutch LU is engaged (after the time point t2), the torque $T_{ds}$ of the drive shaft 2 is reduced with a slight delay due to the inertia of the engine ENG (the inertia of the engine ENG reduced by the engagement of the lock-up clutch LU). Thereafter, in the time chart before the vibration damping, after the lock-up clutch LU is engaged, the torque $T_{ds}$ of the drive shaft 2 is affected by the vibration of the vehicle 100 caused by the engagement of the lock-up clutch LU, and a waveform of the change over time is formed to be (that is, a sine wave).

Therefore, as a result of extensive research of the inventor, in order to prevent the vibration of the vehicle 100 caused by the engagement of the lock-up clutch LU (that is, to smooth out the sine waves shown in (b) to (e) of FIG. 3 (particularly the sine wave shown in (e) of FIG. 3), it is found that after the lock-up clutch LU is engaged, it is effective to change the gear ratio Ratio of the variator VA to the gear ratio Ratio (solid line in (a) of FIG. 3) of the variator VA after the vibration damping so that the rotation speed is in the opposite phase to the rotation speed $N_{sec}$ (broken line in (a) of FIG. 3) of the secondary pulley SEC before the vibration damping.

Specifically, as indicated by the solid line in (a) of FIG. 3, at a time point t3 while the rotation speed $N_{sec}$ of the secondary pulley SEC is decreasing (see (d) of FIG. 3), the gear ratio Ratio of the variator VA is shifted to a smaller value (that is, the reduction ratio is reduced and changed to the high side). Accordingly, since return movement of the drive shaft 2 which has been twisted by the engagement of the lock-up clutch LU can be canceled (since the torque $T_{ds}$ of the drive shaft 2 that is convex downward from a time point t4 to a time point t6 in (e) of FIG. 3 can be canceled), the vibration of the vehicle 100 caused by the engagement of the lock-up clutch LU can be prevented (that is, as shown by the solid lines in (b) to (e) of FIG. 3, the sine waves (particularly the sine wave shown in (e) of FIG. 3) are smoothed out, that is, a torque fluctuation from the time point t4 to the time point t6 are canceled by gear shifting, so that torque fluctuations from the time point t6 to a time point t7 and from the time point t7 onwards, including a time point t8, can be reduced.) As a result, an influence of the vibration on a behavior of the vehicle 100 can be reduced.

In the present embodiment, a mechanism of the vibration damping process described using the sine waves in (b) to (e) of FIG. 3, but is not limited thereto and may be described using other waveforms, such as a triangular wave or a square wave.

(Control Process of Transmission)

Next, the control process of the transmission TM will be described with reference to FIGS. 3 and 4.

Figure 4:
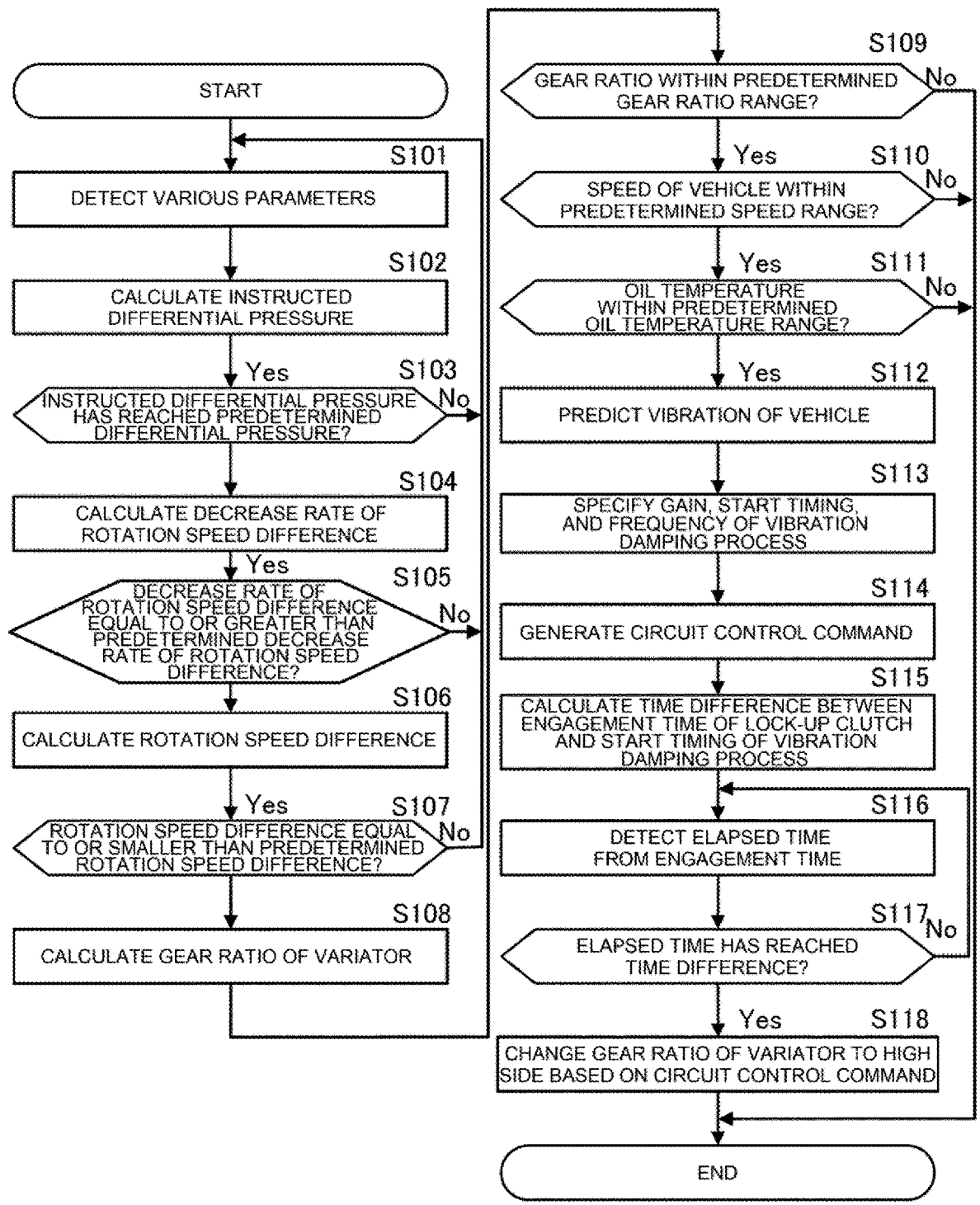
FIG. 4 is a flowchart illustrating a control process of a transmission.

FIG. 4 is a flowchart showing the control process of the transmission TM.

When an ignition switch (not shown) of the vehicle 100 is changed from OFF to ON by the driver, the control process of the transmission TM is started.

As shown in FIG. 4, first, in step S101, the various sensors 4 detect the various parameters. Further, the various sensors 4 output the various detected parameters to the controller 3, and the process proceeds to step S102.

Specifically, in step S101, the hydraulic pressure detection sensor 41, the engine speed detection sensor 42, the turbine speed detection sensor 43, the vehicle speed detection sensor 44, the accelerator opening detection sensor 45, the oil temperature detection sensor 46, the primary pulley speed detection sensor 47, and the secondary pulley speed detection sensor 48 respectively detect the hydraulic pressure in the hydraulic pressure control circuit 1, the rotation speed of the engine ENG, the rotation speed of the turbine TBN, the speed of the vehicle 100, the accelerator opening, the oil temperature, the rotation speed of the primary pulley PRI, and the rotation speed of the secondary pulley SEC within a predetermined time. Further, the hydraulic pressure detection sensor 41, the engine speed detection sensor 42, the turbine speed detection sensor 43, the vehicle speed detection sensor 44, the accelerator opening detection sensor 45, and the oil temperature detection sensor 46 respectively output the hydraulic pressure in the hydraulic pressure control circuit 1, the rotation speed of the engine ENG, the rotation speed of the turbine TBN, the speed of the vehicle 100, the accelerator opening, the oil temperature, the rotation speed of the primary pulley PRI, and the rotation speed of the secondary pulley SEC which have been detected within the predetermined time to the storage unit 33, the circuit control unit 34, and the motor control unit 35 via the input interface 31.

Next, in step S102, the calculation module 341 of the circuit control unit 34 calculates an instructed differential pressure (hereinafter, simply referred to as an instructed differential pressure) to the lock-up clutch LU based on the various parameters output from the various sensors 4. Further, the calculation module 341 outputs the calculated instructed differential pressure to the storage unit 33 and the determination module 342, and proceeds to step S103.

Next, in step S103, the determination module 342 of the circuit control unit 34 determines whether the instructed differential pressure has reached a predetermined differential pressure stored in the storage unit 33 in advance. Here, the predetermined differential pressure is an index for determining whether the lock-up clutch LU has a capacity. Further, the predetermined differential pressure is specified according to a type or the like of the vehicle 100.

When the instructed differential pressure has reached the predetermined differential pressure (Yes), that is, when the lock-up clutch LU has a capacity, the process proceeds to step S104. On the other hand, when the instructed differential pressure has not reached the predetermined differential pressure (No), that is, when the lock-up clutch LU does not have a capacity, the process returns to step S101.

Next, in the case of Yes in step S103, in step S104, the calculation module 341 calculates a rate of change in the rotation speed difference between the engine ENG and the turbine TBN (specifically, the decrease rate of the rotation speed difference between the engine ENG and the turbine TBN, hereinafter, also simply referred to as the decrease rate of the rotation speed difference) based on the rotation speed of the engine ENG within the predetermined time and the rotation speed of the turbine TBN within the predetermined time. Further, the calculation module 341 outputs the calculated decrease rate of the rotation speed difference to the storage unit 33 and the determination module 342, and the process proceeds to step S105.

Next, in step S105, the determination module 342 determines whether the decrease rate of the rotation speed difference is equal to or greater than the predetermined decrease rate of the rotation speed difference that is set in advance and stored in the storage unit 33. Here, the predetermined decrease rate of the rotation speed difference is an index for determining whether the lock-up clutch LU is engaged in a short period of time. Further, the predetermined decrease rate of the rotation speed difference is specified according to the type of the vehicle 100 and the like.

Further, when the decrease rate of the rotation speed difference is equal to or greater than the predetermined decrease rate of the rotation speed difference (Yes), that is, when the lock-up clutch LU is engaged in a short period of time, the process proceeds to step S106. On the other hand, when the decrease rate of the rotation speed difference is smaller than the predetermined decrease rate of the rotation speed difference (No), that is, when the lock-up clutch LU is not engaged in a short period of time, the process returns to step S101.

Accordingly, since the gear shift process is executed only when it is necessary to prevent the vibration of the vehicle 100 caused by engagement of the lock-up clutch LU, unnecessary vibration damping processes can be omitted.

Next, in the case of Yes in step S105, in step S106, the calculation module 341 calculates the rotation speed difference (specifically, an average rotation speed difference) based on the rotation speed of the engine ENG within the predetermined time and the rotation speed of the turbine TBN within the predetermined time. Further, the calculation module 341 outputs the calculated rotation speed difference to the storage unit 33 and the determination module 342, and the process proceeds to step S107.

Next, in step S107, the determination module 342 determines whether the rotation speed difference is equal to or smaller than the predetermined rotation speed difference stored in advance in the storage unit 33. Here, the predetermined rotation speed difference is an index for determining whether the lock-up clutch LU is completely engaged. Further, the predetermined rotation speed difference is specified according to the type or the like of the vehicle 100.

Further, when the rotation speed difference is equal to or smaller than the predetermined rotation speed difference (Yes), that is, when the lock-up clutch LU is completely engaged, the process proceeds to step S108. On the other hand, when the rotation speed difference is greater than the predetermined rotation speed difference (No), that is, when the lock-up clutch LU is not completely engaged, the process returns to step S101.

Next, in the case of Yes in step S107, in step S108, the calculation module 341 calculates the gear ratio of the variator VA (specifically, an average gear ratio) based on the rotation speed of the primary pulley PRI within the predetermined time and the rotation speed of the secondary pulley SEC within the predetermined time. Further, the calculation module 341 outputs the computed gear ratio of the variator VA to the storage unit 33, the determination module 342, the gain specifying module 344, and the frequency specifying module 346, and the process proceeds to step S109.

Next, in step S109, the determination module 342 determines whether the gear ratio of the variator VA is within the predetermined gear ratio range stored in advance in the storage unit 33. Here, the predetermined gear ratio range is an index for determining whether the driver or the like is likely to feel the vibration of the vehicle 100 caused by the engagement of the lock-up clutch LU. Further, the predetermined gear ratio range is specified according to the type or the like of the vehicle 100.

Further, when the gear ratio of the variator VA is within the predetermined gear ratio range (Yes), that is, when the driver or the like is likely to feel the vibration of vehicle 100 caused by the engagement of the lock-up clutch LU, the process proceeds to step S110. On the other hand, when the gear ratio of the variator VA is not within the predetermined gear ratio range (No), that is, when the driver or the like is less likely to feel the vibration of the vehicle 100 caused by the engagement of the lock-up clutch LU, the control process is ended without performing the vibration damping process.

Next, in the case of Yes in step S109, in step S110, the determination module 342 determines whether the speed of the vehicle 100 is within the predetermined speed range that is set in advance and stored in the storage unit 33. Here, the predetermined speed range is an index for determining whether the driver or the like is likely to feel the vibration of the vehicle 100 caused by the engagement of the lock-up clutch LU. The predetermined speed range is specified according to the type or the like of the vehicle 100. In step S110, instead of determining whether the speed of the vehicle 100 is within the predetermined speed range that is set in advance and stored in the storage unit 33, the determination module 342 may determine whether the speed of the vehicle 100 is equal to or lower than a predetermined speed that is set in advance and stored in the storage unit 33.

Further, when the speed of the vehicle 100 is within the predetermined speed range (Yes), that is, when the driver or the like is likely to feel the vibration of the vehicle 100 caused by the engagement of the lock-up clutch LU, the process proceeds to step S111. On the other hand, when the speed of the vehicle 100 is not within the predetermined speed range (No), that is, when the driver or the like is less likely to feel the vibration of the vehicle 100 caused by the engagement of the lock-up clutch LU, the control process is ended without performing the vibration damping process.

Next, in the case of Yes in step S110, in step S111, the determination module 342 determines whether the oil temperature stored in the storage unit 33 in advance is within the predetermined oil temperature range. Here, the predetermined oil temperature is an index for determining whether the oil temperature is within an activation region of the vibration damping process. Further, the predetermined oil temperature is specified according to the type or the like of the vehicle 100.

Then, when the oil temperature is within the predetermined oil temperature range (Yes), that is, when the oil temperature is within the activation region of the vibration damping process, the process proceeds to step S112. On the other hand, when the oil temperature is not within the predetermined oil temperature range (No), that is, when the oil temperature is not within the activation region of the vibration damping process, the control process is ended without performing the vibration damping process.

Next, in the case of Yes in step S111, in step S112, the vibration prediction module 343 predicts the vibration of the vehicle 100 occurring when the vibration damping process is not performed, based on the decrease rate of the rotation speed difference at the time of the engagement of the lock-up clutch LU (time point t2). Further, the vibration prediction module 343 outputs predicted vibration information related to the predicted vibration of the vehicle 100 to the gain specifying module 344, the timing specifying module 345, and the frequency specifying module 346, and the process proceeds to step S113. Here, the predicted vibration information includes amplitude, a start timing, and a frequency. The greater the decrease rate of the rotation speed difference, the greater the amplitude of the vehicle 100.

Next, in step S113, the gain specifying module 344, the timing specifying module 345, and the frequency specifying module 346 specify a gain, the start timing, and the frequency of the vibration damping process based on the predicted vibration information output from the vibration prediction module 343 at the time of the engagement of the lock-up clutch LU (time point t2). Further, the gain specifying module 344, the timing specifying module 345, and the frequency specifying module 346 output the gain, the start timing, and the frequency of the specified vibration damping process to the command generating module 347, respectively, and the process proceeds to step S114.

Specifically, in step S113, when the vibration damping process is not performed, the gain specifying module 344 determines the gain of the vibration damping process for determining a magnitude of the hydraulic pressure, which is a hydraulic pressure required for the gear ratio of the variator VA to cancel a torque fluctuation (specifically, the torque fluctuation from the time point t4 to the time point t6 shown in (e) of FIG. 3) caused by the vibration of the vehicle 100 and supplied to the primary pulley PRI, based on the predicted vibration information obtained based on the decrease rate of the rotation speed difference, the gear ratio of the variator VA, and the speed of the vehicle 100. Further, the gain specifying module 344 outputs the specified gain to the command generating module 347.

More specifically, in step S113, the gain specifying module 344 specifies the gain such that the gain increases as the decrease rate of the rotation speed difference increases. Accordingly, by optimizing the gear ratio of the variator VA, it is possible to more appropriately cancel the return movement of the drive shaft 2 which has been twisted by the engagement of the lock-up clutch LU, thereby reducing the sense of discomfort felt by the driver.

More specifically, in step S113, the gain specifying module 344 specifies the gain such that the gain increases as the speed of the vehicle 100 decreases. Accordingly, by optimizing the gear ratio of the variator VA, it is possible to more appropriately cancel the return movement of the drive shaft 2 which has been twisted by the engagement of the lock-up clutch LU, thereby reducing the sense of discomfort felt by the driver.

At the same time, in step S113, the timing specifying module 345 specifies, based on the predicted vibration information, the start timing (time point t3 shown in (d) of FIG. 3) of the vibration damping process for canceling the torque fluctuation (specifically, the torque fluctuation from the time point t4 to the time point t6 shown in (e) of FIG. 3) caused by the vibration of the vehicle 100 when the vibration damping process is not performed. Further, the timing specifying module 345 outputs the specified start timing (time point t3 shown in (d) of FIG. 3) to the calculation module 341 and the command generating module 347.

The time point t3 shown in (d) of FIG. 3 is located during a period during which the rotation speed of the secondary pulley SEC decreases when the vibration damping process is not performed. That is, the time point t3 is located between the time point t2 at which the lock-up clutch LU is engaged and the time point t4 at which the torque fluctuation caused by the vibration of the vehicle 100 occurs.

At the same time, in step S113, the frequency specifying module 346 specifies the frequency of the vibration damping process for canceling the torque fluctuation (specifically, the torque fluctuation from the time point t4 to the time point t6 shown in (e) of FIG. 3) caused by the vibration of the vehicle 100 when the vibration damping process is not performed based on the natural frequency of the power train specified by the gear ratio of the variator VA and the table stored in advance in the storage unit 33. Further, the frequency specifying module 346 outputs the specified frequency to the command generating module 347.

As the gear ratio of the variator VA becomes lower, the natural frequency of the power train decreases. On the other hand, as the gear ratio of the variator VA becomes higher, the natural frequency of the power train becomes larger.

Next, in step S114, the command generating module 347 generates a circuit control command as a vibration damping command for changing the gear ratio of the variator VA to the high side on the basis of the gain, the start timing, and the frequency of the vibration damping process output from the gain specifying module 344, the timing specifying module 345, and the frequency specifying module 346, respectively. Further, the command generating module 347 outputs the generated circuit control command to the hydraulic pressure control circuit 1 via the output interface 32, and the process proceeds to step S115.

Next, in step S115, the calculation module 341 calculates a time difference (hereinafter, also simply referred to as a time difference) between the engagement time (t2) of the lock-up clutch LU and the start timing (time point t3 shown in (d) of FIG. 3) of the vibration damping process based on the start timing (time point t3 shown in (d) of FIG. 3) output from the timing specifying module 345. Further, the calculation module 341 outputs the calculated time difference to the determination module 342, and the process proceeds to step S116.

Next, in step S116, the timer 36 detects an elapsed time from the engagement time (time point t2) of the lock-up clutch LU. Further, the timer 36 outputs the detected elapsed time to the determination module 342, and the process proceeds to step S117.

Next, in step S117, the determination module 342 determines whether the elapsed time output from the timer 36 has reached the time difference output from the calculation module 341.

When the elapsed time has reached the time difference (Yes), that is, when the time has reached the start timing (time point t3 shown in (d) of FIG. 3) of the vibration damping process, the process proceeds to step S118. On the other hand, when the elapsed time has not reached the time difference (No), that is, when the time has not reached the start timing (time point t3 shown in (d) of FIG. 3) of the vibration damping process, the process returns to step S116.

Next, in the case of Yes in step S117, in step S118, when the vibration damping process is not performed, the hydraulic pressure control circuit 1 increases the hydraulic pressure (that is, the primary pulley pressure Ppri) supplied to the primary pulley PRI so as to change the gear ratio of the variator VA to the high side (see (a) of FIG. 3) while the rotation speed of the secondary pulley SEC is decreasing, based on the circuit control command output from the command generating module 347. Then, this control process is ended.

Accordingly, since the return movement of the drive shaft 2 which has been twisted by the engagement of the lock-up clutch LU can be canceled, it is possible to prevent the vibration caused by the engagement of the lock-up clutch LU. As a result, the influence of the vibration on the behavior of the vehicle 100 can be reduced.

In the present embodiment, in step S118, the hydraulic pressure control circuit 1 increases the hydraulic pressure (that is, the primary pulley pressure Ppri) supplied to the primary pulley PRI so as to change the gear ratio of the variator VA to the high side, based on the circuit control command output from the command generating module 347. However, in step S118, the hydraulic pressure control circuit 1 is not limited thereto, and for example, the hydraulic pressure (that is, the secondary pulley pressure Psec) to be supplied to the secondary pulley SEC may be decreased so as to change the gear ratio of the variator VA to the high side based on the circuit control command output from the command generating module 347.

In this case, the circuit control command is a command for reducing the hydraulic pressure supplied to the secondary pulley SEC.

(Modification)

In the above embodiment, the hydraulic pressure control circuit 1 changes the gear ratio of the variator VA to the high side while the rotation speed of the secondary pulley SEC decreases in the case in which the vibration damping process is not performed. However, the hydraulic pressure control circuit 1 is not limited thereto, and, for example, in the case in which the vibration damping process is not performed, after the rotation speed of the secondary pulley SEC decreases, the gear ratio of the variator VA may be changed to the low side while the rotation speed of the secondary pulley SEC increases.

Even in this case, in the case in which the vibration damping process is not performed after the lock-up clutch LU is engaged, the rotation speed of the secondary pulley SEC decreases, and then the gear ratio of the variator VA is changed to the low side while the rotation speed of the secondary pulley SEC before the vibration damping increases, thereby canceling return movement of the drive shaft 2 that has been twisted by the engagement of the lock-up clutch LU. Thus, it is possible to prevent the vibration caused by the engagement of the lock-up clutch LU. As a result, the influence of the vibration on the behavior of the vehicle 100 can be reduced.

(Functions and Effects)

Next, main functions and effects of the present embodiment and the modification will be described.

(1) The controller 3 (control device) for the transmission TM is the controller 3 (control device) for the transmission TM including the variator VA (continuously variable transmission mechanism) including the primary pulley PRI to which the power of the engine ENG (drive source) mounted on the vehicle 100 is input, the secondary pulley SEC that transmits the power to the drive wheels DW, and the belt BLT (endless annular member) that is wound around the primary pulley PRI and the secondary pulley SEC, in which the rotation speed of the secondary pulley SEC increases as the torque transmission capacity of the lock-up clutch LU of the torque converter TC provided between the engine ENG (drive source) and the primary pulley PRI increases, and after the lock-up clutch LU is engaged, the controller 3 performs the gear shift process to change the gear ratio of the variator VA (continuously variable transmission mechanism) to the high side or the low side so as to cancel the return movement of the drive shaft 2 which has been twisted by the engagement of the lock-up clutch LU.

(9) A control method for the transmission TM is a method for controlling the transmission TM including the variator VA (continuously variable transmission mechanism) including the primary pulley PRI to which the power of the engine ENG (drive source) mounted on the vehicle 100 is input, the secondary pulley SEC that transmits the power to the drive wheels DW, and the belt BLT (endless annular member) that is wound around the primary pulley PRI and the secondary pulley SEC, the method including: increasing the rotation speed of the secondary pulley SEC as the torque transmission capacity of the lock-up clutch LU of the torque converter TC provided between the engine ENG (drive source) and the primary pulley PRI increases, and after the lock-up clutch LU is engaged, changing the gear ratio of the variator VA (continuously variable transmission mechanism) to the high side or the low side so as to cancel the return movement of the drive shaft 2 which has been twisted by the engagement of the lock-up clutch LU.

(10) A program executable by a CPU (computer) that controls a transmission TM including a variator VA (continuously variable transmission mechanism) including the primary pulley PRI to which the power of the engine ENG (drive source) mounted on the vehicle 100 is input, the secondary pulley SEC that transmits the power to the drive wheels DW, and the belt BLT (endless annular member) that is wound around the primary pulley PRI and the secondary pulley SEC, the program causing the CPU (computer) to execute: a step of increasing the rotation speed of the secondary pulley SEC as the torque transmission capacity of the lock-up clutch LU of the torque converter TC provided between the engine ENG (drive source) and the primary pulley PRI increases, and after the lock-up clutch LU is engaged, changing the gear ratio of the variator VA (continuously variable transmission mechanism) to the high side or the low side so as to cancel the return movement of the drive shaft 2 which has been twisted by the engagement of the lock-up clutch LU.

(11) The controller 3 (control device) for the transmission TM is the controller 3 (control device) for the transmission TM including the variator VA (continuously variable transmission mechanism) including the primary pulley PRI to which the power of the engine ENG (drive source) mounted on the vehicle 100 is input, the secondary pulley SEC that transmits the power to the drive wheels DW, and the belt BLT (endless annular member) that is wound around the primary pulley PRI and the secondary pulley SEC, in which the rotation speed of the secondary pulley SEC increases as the torque transmission capacity of the lock-up clutch LU of the torque converter TC provided between the engine ENG (drive source) and the primary pulley PRI increases, and after the lock-up clutch LU is engaged, the controller 3 changes the gear ratio of the variator VA (continuously variable transmission mechanism) to the high side after the rotation speed of the secondary pulley SEC decreases and before the rotation speed of the secondary pulley SEC increases.

According to these configurations, after the lock-up clutch LU is engaged, the controller 3 changes the gear ratio of the variator VA (continuously variable transmission mechanism) to the high side or the low side so as to cancel the return movement of the drive shaft 2 which has been twisted by the engagement of the lock-up clutch LU, and thus the return movement of the drive shaft 2 which has been twisted by the engagement of the lock-up clutch LU can be canceled. Therefore, the vibration caused by the engagement of the lock-up clutch LU can be prevented. As a result, the influence of the vibration on the behavior of the vehicle 100 can be reduced.

(2) When the vibration damping process (gear shift process) is not performed after the lock-up clutch LU is engaged, the controller 3 (control device) for the transmission TM changes the gear ratio of the variator VA (continuously variable transmission mechanism) to the high side while the rotation speed of the secondary pulley SEC decreases.

According to this configuration, when the vibration damping process (gear shift process) is not performed after the lock-up clutch LU is engaged, the gear ratio of the variator VA (continuously variable transmission mechanism) is changed to the high side while the rotation speed of the secondary pulley SEC decreases, and thus, the return movement of the drive shaft 2 that has been twisted by the engagement of the lock-up clutch LU can be canceled. Therefore, the vibration caused by the engagement of the lock-up clutch LU can be prevented. As a result, the influence of the vibration on the behavior of the vehicle 100 can be reduced.

(3) In the case in which the decrease rate of the rotation speed difference between the engine ENG (drive source) and the turbine TBN of the torque converter TC at the time of the engagement of the lock-up clutch LU is equal to or greater than the predetermined decrease rate of the rotation speed difference, the controller 3 (control device) for the transmission TM changes the gear ratio of the variator VA (continuously variable transmission mechanism) to the high side while the rotation speed of the secondary pulley SEC decreases when the vibration damping process (gear shift process) is not performed after the lock-up clutch LU is engaged.

According to this configuration, only when the decrease rate of the rotation speed difference between the engine ENG (drive source) and the turbine TBN of the torque converter TC is equal to or greater than the predetermined decrease rate of the rotation speed difference, the vibration damping process (gear shift process) is executed, and thus unnecessary vibration damping process (gear shift process) can be omitted. Further, since the return movement of the drive shaft 2 which has been twisted by the engagement of the lock-up clutch LU can be canceled, it is possible to prevent the vibration of the vehicle 100 caused by the engagement of the lock-up clutch LU. As a result, the influence of the vibration on the behavior of the vehicle 100 can be reduced.

(4) In the case in which the decrease rate of the rotation speed difference between the engine ENG (drive source) and the turbine TBN of the torque converter TC at the time of the engagement of the lock-up clutch LU is equal to or greater than the decrease rate set in advance, the controller 3 (control device) for the transmission TM changes the gear ratio of the variator VA (continuously variable transmission mechanism) to the high side while the rotation speed of the secondary pulley SEC decreases when the vibration damping process (gear shift process) is not performed after the lock-up clutch LU is engaged.

According to this configuration, by optimizing the gear ratio of the variator VA (continuously variable transmission mechanism), it is possible to more appropriately cancel the return movement of the drive shaft 2 which has been twisted by the engagement of the lock-up clutch LU, thereby reducing the sense of discomfort felt by the driver.

(5) In the case in which the speed of the vehicle 100 is within the predetermined speed range, the controller 3 (control device) for the transmission TM changes the gear ratio of the variator VA (continuously variable transmission mechanism) to the high side while the rotation speed of the secondary pulley SEC decreases when the vibration damping process (gear shift process) is not performed after the lock-up clutch LU is engaged.

According to this configuration, only when the driver or the like is likely to feel the vibration of the vehicle 100 caused by the engagement of the lock-up clutch LU, the vibration damping process (gear shift process) is executed, and thus the unnecessary vibration damping process (gear shift process) can be omitted. Further, since the return movement of the drive shaft 2 which has been twisted by the engagement of the lock-up clutch LU can be canceled, it is possible to prevent the vibration of the vehicle 100 caused by the engagement of the lock-up clutch LU. As a result, the influence of the vibration on the behavior of the vehicle 100 can be reduced.

(6) In the case in which the speed of the vehicle 100 is equal to or smaller than the predetermined speed set in advance, the controller 3 (control device) for the transmission TM changes the gear ratio of the variator VA (continuously variable transmission mechanism) to the high side while the rotation speed of the secondary pulley SEC decreases when the vibration damping process (gear shift process) is not performed after the lock-up clutch LU is engaged.

According to this configuration, by optimizing the gear ratio of the variator VA (continuously variable transmission mechanism), it is possible to more appropriately cancel the return movement of the drive shaft 2 which has been twisted by the engagement of the lock-up clutch LU, thereby reducing the sense of discomfort felt by the driver.

(7) In the case in which the gear ratio of the variator VA (continuously variable transmission mechanism) is within the predetermined gear ratio range, the controller 3 (control device) for the transmission TM changes the gear ratio of the variator VA (continuously variable transmission mechanism) to the high side while the rotation speed of the secondary pulley SEC decreases when the vibration damping process (gear shift process) is not performed after the lock-up clutch LU is engaged.

According to this configuration, only when the driver or the like is likely to feel the vibration of the vehicle 100 caused by the engagement of the lock-up clutch LU, the vibration damping process (gear shift process) is executed, and thus the unnecessary vibration damping process (gear shift process) can be omitted. Further, since the return movement of the drive shaft 2 which has been twisted by the engagement of the lock-up clutch LU can be canceled, it is possible to prevent the vibration of the vehicle 100 caused by the engagement of the lock-up clutch LU. As a result, the influence of the vibration on the behavior of the vehicle 100 can be reduced.

(8) When the vibration damping process (gear shift process) is not performed after the lock-up clutch LU is engaged, the controller 3 (control device) for the transmission TM changes the gear ratio of the variator VA (continuously variable transmission mechanism) to the low side while the rotation speed of the secondary pulley SEC increases after the rotation speed of the secondary pulley SEC decreases.

According to this configuration, when the vibration damping process (gear shift process) is not performed after the lock-up clutch LU is engaged, the gear ratio of the variator VA (continuously variable transmission mechanism) is changed to the low side while the rotation speed of the secondary pulley SEC increases after the rotation speed of the secondary pulley SEC decreases, and thus the return movement of the drive shaft 2 that has been twisted by the engagement of the lock-up clutch LU can be canceled. Therefore, the vibration caused by the engagement of the lock-up clutch LU can be prevented. As a result, the influence of the vibration on the behavior of the vehicle 100 can be reduced.

Although the embodiments of the present invention have been described above, the above embodiments are merely a part of application examples of the present invention, and do not mean that the technical scope of the present invention is limited to the specific configurations of the above embodiments.

A series of processes in the above-described transmission TM may be provided as a program causing a computer to execute the processes.

Further, the program for executing the series of processes described above is provided by a computer-readable storage medium. In the controller 3, the program may be stored in the storage unit 33.

The various programs executed by the computer may be stored in a non-transitory storage medium such as a CD-ROM.

The present application claims a priority of Japanese Patent Application No. 2022-043998 filed with the Japan Patent Office on Mar. 18, 2022, all the contents of which are hereby incorporated by reference.

DESCRIPTION OF REFERENCE SIGNS 2 drive shaft
3 controller (control device)
100 vehicle
DW drive wheel
LU lock-up clutch
TC torque converter
TM transmission (belt continuously variable transmission)
VA variator (continuously variable transmission mechanism)
BLT belt (endless annular member)
ENG engine (drive source)
PRI primary pulley
SEC secondary pulley
TBN turbine

The invention claimed is:

1. A control device for a transmission including a continuously variable transmission mechanism including a primary pulley, a secondary pulley, and an endless annular member, the primary pulley being configured to be input power of a drive source mounted on a vehicle, a secondary pulley being configured to transmit the power to a drive wheel, the endless annular member being wound around the primary pulley and the secondary pulley, wherein
a rotation speed of the secondary pulley increases as a torque transmission capacity of a lock-up clutch of a torque converter provided between the drive source and the primary pulley increases, and after the lock-up clutch is engaged, the control device performs a gear shift process to change a gear ratio of the continuously variable transmission mechanism to a high side or a low side so as to cancel return movement of a drive shaft which has been twisted by the engagement of the lock-up clutch.

2. The control device for the transmission according to claim 1, wherein
when the gear shift process is not performed after the lock-up clutch is engaged, the control device changes the gear ratio of the continuously variable transmission mechanism to the high side while the rotation speed of the secondary pulley decreases.

3. The control device for the transmission according to claim 2, wherein
in a case in which a decrease rate of a rotation speed difference between the drive source and a turbine of the torque converter at the time of the engagement of the lock-up clutch is equal to or greater than a predetermined decrease rate of the rotation speed difference, the control device changes the gear ratio of the continuously variable transmission mechanism to the high side while the rotation speed of the secondary pulley decreases when the gear shift process is not performed after the lock-up clutch is engaged.

4. The control device for the transmission according to claim 3, wherein
in a case in which the decrease rate of the rotation speed difference between the drive source and the turbine at the time of the engagement of the lock-up clutch is equal to or greater than a decrease rate set in advance, the control device changes the gear ratio of the continuously variable transmission mechanism to the high side while the rotation speed of the secondary pulley decreases when the gear shift process is not performed after the lock-up clutch is engaged.

5. The control device for the transmission according to claim 2, wherein
in a case in which a speed of the vehicle is within a predetermined speed range, the control device changes the gear ratio of the continuously variable transmission mechanism to the high side while the rotation speed of the secondary pulley decreases when the gear shift process is not performed after the lock-up clutch is engaged.

6. The control device for the transmission according to claim 5, wherein
in a case in which the speed of the vehicle is equal to or smaller than a predetermined speed set in advance, the control device changes the gear ratio of the continuously variable transmission mechanism to the high side while the rotation speed of the secondary pulley decreases when the gear shift process is not performed after the lock-up clutch is engaged.

7. The control device for the transmission according to claim 2, wherein
in a case in which the gear ratio of the continuously variable transmission mechanism is within a predetermined gear ratio range, the control device changes the gear ratio of the continuously variable transmission mechanism to the high side while the rotation speed of the secondary pulley decreases when the gear shift process is not performed after the lock-up clutch is engaged.

8. The control device for the transmission according to claim 1, wherein
when the gear shift process is not performed after the lock-up clutch is engaged, the control device changes the gear ratio of the continuously variable transmission mechanism to the low side while the rotation speed of the secondary pulley increases after the rotation speed of the secondary pulley decreases.

9. A control method for a transmission including a continuously variable transmission mechanism including a primary pulley, a secondary pulley, and an endless annular member, the primary pulley being configured to be input power of a drive source mounted on a vehicle, a secondary pulley being configured to transmit the power to a drive wheel, the endless annular member being wound around the primary pulley and the secondary pulley, the method comprising:
increasing a rotation speed of the secondary pulley as a torque transmission capacity of a lock-up clutch of a torque converter provided between the drive source and the primary pulley increases, and after the lock-up clutch is engaged, changing a gear ratio of the continuously variable transmission mechanism to a high side or a low side so as to cancel return movement of a drive shaft which has been twisted by the engagement of the lock-up clutch.

10. A control device for a transmission including a continuously variable transmission mechanism including a primary pulley, a secondary pulley, and an endless annular member, the primary pulley being configured to be input power of a drive source mounted on a vehicle, a secondary pulley being configured to transmit the power to a drive wheel, the endless annular member being wound around the primary pulley and the secondary pulley, wherein a rotation speed of the secondary pulley increases as a torque transmission capacity of a lock-up clutch of a torque converter provided between the drive source and the primary pulley increases, and after the lock-up clutch is engaged, the control device changes a gear ratio of the continuously variable transmission mechanism to a high side after the rotation speed of the secondary pulley decreases and before the rotation speed of the secondary pulley increases.

* * * * *